US012279331B2

(12) United States Patent
Li

(10) Patent No.: US 12,279,331 B2
(45) Date of Patent: Apr. 15, 2025

(54) METHOD AND APPARATUS FOR CONFIGURING PARAMETERS FOR DISCONTINUOUS RECEPTION, TERMINAL, AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 447 days.

(21) Appl. No.: 17/755,909

(22) PCT Filed: Nov. 12, 2019

(86) PCT No.: PCT/CN2019/117643
§ 371 (c)(1),
(2) Date: May 11, 2022

(87) PCT Pub. No.: WO2021/092773
PCT Pub. Date: May 20, 2021

(65) Prior Publication Data
US 2022/0386408 A1    Dec. 1, 2022

(51) Int. Cl.
*H04W 76/28*    (2018.01)
(52) U.S. Cl.
CPC .................. *H04W 76/28* (2018.02)
(58) Field of Classification Search
CPC ....... H04W 76/28; H04W 76/38; H04W 8/24; Y02D 30/70
See application file for complete search history.

(56) References Cited

U.S. PATENT DOCUMENTS

| 2004/0064445 | A1* | 4/2004 | Pfleging | H04W 4/20 |
| 2011/0312288 | A1* | 12/2011 | Fu | H04B 1/406 455/88 |
| 2012/0082140 | A1* | 4/2012 | Lin | H04W 72/1215 370/336 |
| 2015/0131506 | A1* | 5/2015 | Dai | H04W 28/18 370/311 |
| 2019/0246414 | A1* | 8/2019 | Yang | H04W 72/21 |
| 2020/0120596 | A1* | 4/2020 | Yu | H04W 52/0216 |
| 2020/0137822 | A1* | 4/2020 | Lee | H04W 76/28 |
| 2022/0151015 | A1* | 5/2022 | Lu | H04W 76/28 |

FOREIGN PATENT DOCUMENTS

| CN | 107241786 A | 10/2017 |
| CN | 107484249 A | 12/2017 |
| CN | 108377537 A | 8/2018 |

OTHER PUBLICATIONS

"Consideration for DRX in NR," Proceedings of the 3GPP TSG-RAN2 Meeting NR AH#2, Jun. 27, 2017, Qingdao, China, LG Electronics Inc., R2-1706750, 4 pages.

* cited by examiner

*Primary Examiner* — Kiet Tang
(74) *Attorney, Agent, or Firm* — McCoy Russell LLP

(57) ABSTRACT

A method for configuring parameters for DRX. The method includes: acquiring DRX configuration parameters for DRX, the DRX configuration parameters for DRX comprising a first DRX configuration parameter used by an uplink service and a second DRX configuration parameter used by a downlink service.

16 Claims, 5 Drawing Sheets

METHOD AND APPARATUS FOR CONFIGURING PARAMETERS FOR DISCONTINUOUS RECEPTION, TERMINAL, AND STORAGE MEDIUM

CROSS REFERENCE TO RELATED APPLICATION

The present application is a U.S. National Phase of International Application No. PCT/CN2019/117643 entitled "METHOD AND APPARATUS FOR CONFIGURING PARAMETERS FOR DISCONTINUOUS RECEPTION, TERMINAL, AND STORAGE MEDIUM," and filed on Nov. 12, 2019. The entire contents of the above-listed application is hereby incorporated by reference for all purposes.

TECHNICAL FIELD

The present disclosure relates to the technical field of communications, in particular to a method and apparatus for configuring parameters for discontinuous reception (DRX), a terminal, and a storage medium.

BACKGROUND

A novel terminal with transmission delay, rate requirements, and terminal cost all between a narrowband terminal and a new radio (NR) terminal is introduced to a New Radio Lite (NR lite) system. The novel terminal is mainly applied to three scenarios: industrial sensors, video surveillance and wearable devices.

SUMMARY

The present disclosure relates to the technical field of communications, in particular to a method and apparatus for configuring parameters for DRX, a terminal, and a storage medium.

According to an aspect of the present disclosure, a method for configuring parameters for DRX is provided. The method includes:
obtaining DRX configuration parameters for DRX, the DRX configuration parameters for DRX including: a first DRX configuration parameter used by an uplink service and a second DRX configuration parameter used by a downlink service.

According to another aspect of the present disclosure, a method for configuring parameters for DRX is provided. The method includes:
configuring user equipment (UE) with DRX configuration parameters for DRX, the DRX configuration parameters for DRX including: a first DRX configuration parameter used by an uplink service and a second DRX configuration parameter used by a downlink service.

According to yet another aspect of the present disclosure, a terminal is provided. The terminal includes:
a processor;
a transceiver connected to the processor; and
a memory configured to store executable instructions of the processor, where
the processor is configured to implement the above method for configuring parameters for DRX by loading and executing the executable instructions.

According to yet another aspect of the present disclosure, a chip is provided. The chip includes a programmable logic circuit and/or program instructions, and is configured to implement the above method for configuring parameters for DRX during running.

According to yet another aspect of the present disclosure, a non-transitory computer-readable storage medium is provided. The computer-readable storage medium stores executable instructions, and the above method for configuring parameters for DRX is implemented by loading and executing the executable instructions.

BRIEF DESCRIPTION OF THE DRAWINGS

In order to more clearly illustrate the technical solutions in the examples of the present disclosure, a brief description will be given below with reference to the accompanying drawings which are required to be used in the description of the examples. It is apparent that the drawings in the description below are only some examples of the present disclosure, and it would be apparent for those ordinarily skilled in the art to obtain other drawings according to these drawings without involving any inventive effort.

DETAILED DESCRIPTION

In order to make the objectives, technical solutions and benefits of the present disclosure clearer, the examples of the present disclosure will be further described in detail below with reference to the accompanying drawings.

There is an obvious difference between the novel terminal for video surveillance and the NR terminal, that is, the service transmission of the novel terminal is asymmetrical. For example, when a surveillance video needs to be uploaded, there are a large quantity of data to be transmitted in the uplink direction, but a small quantity of downlink data packets, such as system notification messages, needing to be received in the downlink direction. As a result, service transmission in the uplink and downlink directions is asymmetrical.

Since the service transmission in the uplink and downlink directions is asymmetrical, an uplink and a downlink have different monitoring requirements for a control channel, and how to satisfy the monitoring requirements of the novel terminal for the control channel is a technical problem to be solved urgently.

Figure 1:
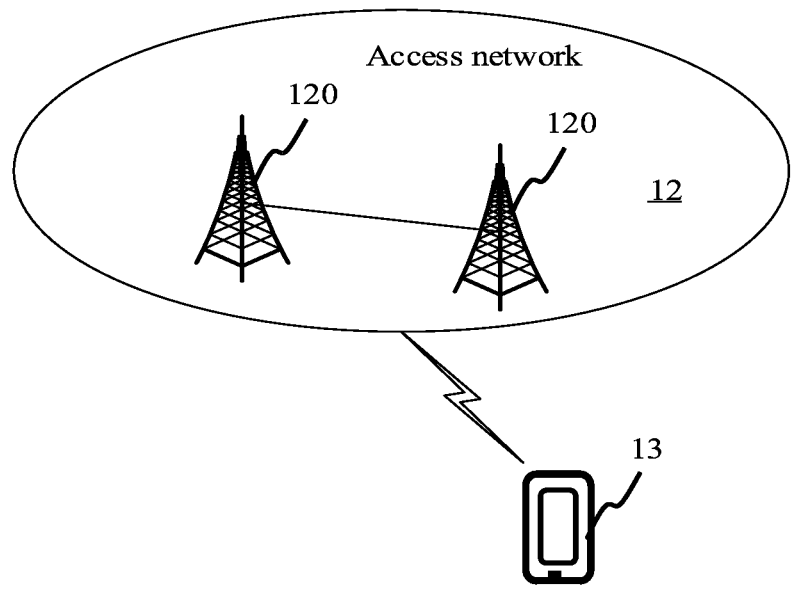
FIG. 1 is a block diagram of a communication system according to an example of the present disclosure.

FIG. 1 is a block diagram of a communication system according to an example of the present disclosure. The communication system may work on an unlicensed spectrum, and may include: an access network 12 and a terminal 13.

The access network 12 includes a plurality of access network devices 120. The access network devices 120 may be base stations, and the base stations are devices deployed in the access network to provide a wireless communication function for the terminal. The base stations may include various forms of macro base stations, micro base stations, relay stations, access points and so on. In the 5G NR-U system, a device functioning as a base station is called gNodeB or gNB. As communication technology evolves, the description of "base station" may change.

The terminal 13 may include various handheld devices with a wireless communication function, vehicle-mounted devices, wearable devices, computing devices or other processing devices connected to the wireless modems, as well as various forms of user equipment, mobile stations (MS), terminal devices and so on. For the convenience of description, the devices mentioned above are collectively referred to as terminals. The access network devices 120 and the terminal 13 communicate with each other via a radio technology, such as a Uu interface.

In some examples, the terminal 13 is a novel terminal in an NR lite system, and the novel terminal is mainly applied to three scenarios: industrial sensors, video surveillance, and wearable devices.

It should be noted that the following examples of the present disclosure are only illustrated with the terminal accessing the access network devices as an example, and after learning the technical solutions of the present disclosure, it would have readily occurred to those skilled in the art to use a method for stopping monitoring of a paging occasion provided by the present disclosure as a method for stopping monitoring of other paging occasions of subsequent evolution, and apply same to the case where other terminals access other access network devices, but these extended solutions should fall within the scope of protection of the present disclosure.

The following briefly introduces a plurality of technical terms involved in the examples of the present application.

Discontinuous reception (DRX): with DRX, the terminal may periodically enter Opportunity for DRX at certain times without monitoring physical downlink control channel (PDCCH) scheduling information (also referred to as PDCCH subframe), and wake up from the Opportunity for DRX when needing to monitor the PDCCH scheduling information so as to save power.

Figure 2:
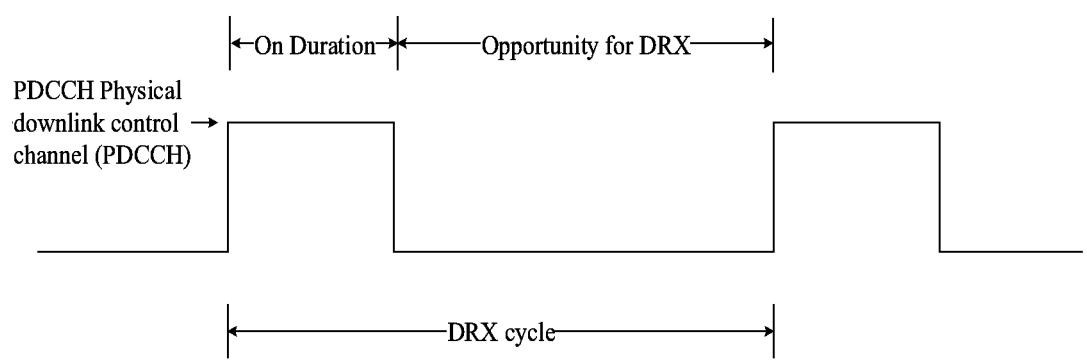
FIG. 2 is a flow diagram of a method for configuring parameters for DRX according to an example of the present disclosure.

The basic mechanism of DRX is to configure a terminal in a radio resource control_connected (RRC_CONNECTED) state with a DRX cycle. The DRX cycle consists of "On Duration" and the "Opportunity for DRX". The terminal monitors and receives the PDCCH scheduling information during the "On Duration", and does not receive data of a downlink channel during the "Opportunity for DRX" to save power. As shown is FIG. 2, time is divided into successive DRX cycles in the time domain. When the terminal receives a scheduling message during the "On Duration", the terminal may start a DRX-InactivityTimer and monitor the PDCCH scheduling information in each subframe during the period. In response to determining that the DRX-InactivityTimer is running, the terminal still needs to continue to monitor downlink PDCCH subframes until the DRX inactivity timer times out even if the originally configured On Duration time has expired.

One DRX cycle is equal to the sum of the wake-up time and sleep time of the terminal, where the wake-up time is a duration of the On Duration state in one cycle, and the sleep time is a duration of the Opportunity for DRX in one cycle.

A network side device may control the DRX cycle of the terminal by configuring timer parameters. The timer parameters may include:

1) a discontinuous reception duration timer (drx-onDurationTimer). The terminal starts the drx-onDurationTimer in a fixed DRX cycle, and monitors a PDCCH within a duration of the timer.
2) a discontinuous reception inactivity timer (drx-InactivityTimer). The timer is started or restarted when the terminal successfully decodes a PDCCH and the PDCCH is scheduled for initial transmission. The terminal monitors the PDCCH within a duration of the timer.
3) a discontinuous reception downlink retransmission timer (drx-RetransmissionTimerDL). The terminal maintains the timer separately for each downlink HARQ, and determines that demodulation of corresponding HARQ process data fails. The timer is started after a discontinuous reception downlink HARQ round-trip time timer (drx-HARQ-RTT-TimerDL) times out, and the terminal monitors the PDCCH within a running duration of the timer. Behaviors of the drx-HARQ-RTT-TimerDL are described below.
4) a discontinuous reception uplink retransmission timer (drx-RetransmissionTimerUL). The terminal maintains the timer separately for each uplink HARQ process. The timer is started after a discontinuous reception uplink HARQ round-trip delay timer (drx-HARQ-RTT-TimerUL) times out, and the terminal monitors the PDCCH within a running duration of the timer.
5) a discontinuous reception long cycle (drx-LongCycle). The timer parameter is used to represent a long discontinuous reception cycle.
6) a discontinuous reception short cycle (drx-ShortCycle). The timer parameter is used to represent a short discontinuous reception cycle.
7) a discontinuous reception downlink HARQ round-trip time timer (drx-HARQ-RTT-TimerDL). The timer parameter is maintained separately for each downlink HARQ process. The timer is started at a first symbol after HARQ feedback resources are transmitted. The terminal does not need to monitor the PDCCH within a running duration of the timer.
8) a discontinuous reception uplink HARQ round-trip delay timer (drx-HARQ-RTT-TimerUL). The timer parameter is maintained separately for each uplink HARQ process. The timer is started at a first symbol after the terminal transmits data resources. The terminal does not need to monitor the PDCCH within a running duration of the timer.

In the related art, the terminal receives an uplink scheduling grant (UL Grant) sent by the network side device, and feeds back HARQ feedback information of a downlink datum at a time-frequency domain resource position indicated by the uplink scheduling grant. The HARQ feedback information includes an acknowledgement (ACK) message and a negative acknowledgement (NACK) message. The terminal starts the drx-HARQ-RTT-TimerDL and stops the drx-Retransmission-TimerDL after feeding back the HARQ feedback information. The terminal does not monitor the PDCCH during running of the drx-HARQ-RTT-TimerDL. After the drx-HARQ-RTT-TimerDL times out, in response to determining that the terminal fails to decode downlink data, the terminal starts the drx-RetransmissionTimerDL, and the terminal monitors DCI for retransmitting the downlink data during running of the drx-RetransmissionTimerDL.

Figure 3:
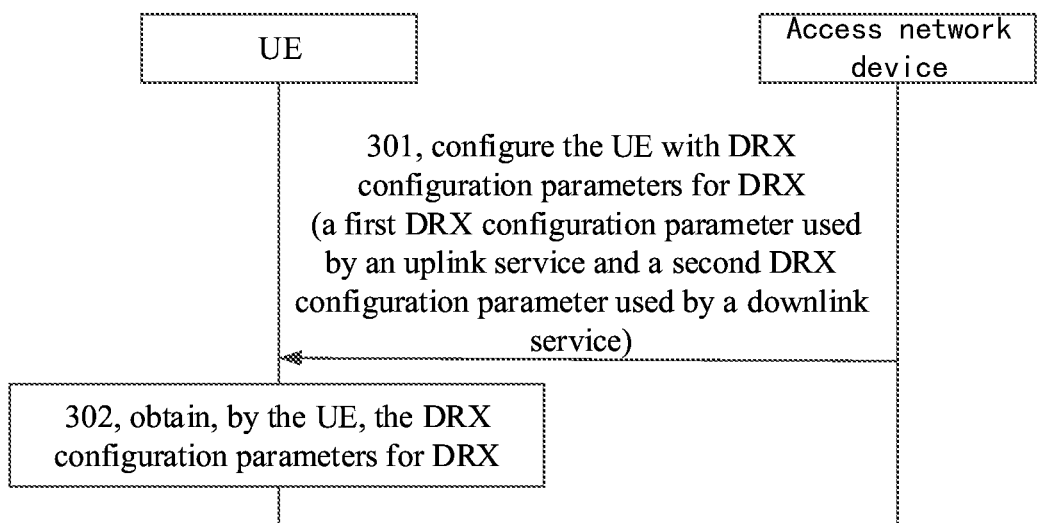
FIG. 3 is a flow diagram of a method for configuring parameters for DRX according to an example of the present disclosure.

FIG. 3 is a flow diagram of a method for configuring parameters for DRX according to an example of the present application. The example is illustrated with the method applied to the communication system shown in FIG. 1 as an example. The method includes the following steps.

Step 301, an access network device configures UE with DRX configuration parameters for DRX. The DRX configuration parameters for DRX include: a first DRX configuration parameter used by an uplink service and a second DRX configuration parameter used by a downlink service.

In some examples, the first DRX configuration parameter is different from the second DRX configuration parameter.

The DRX configuration parameters include, but are not limited to, parameter items of each of the above timers. The first DRX configuration parameter and the second DRX configuration parameter are different. v, the types of parameter items in the first DRX configuration parameter and the second DRX configuration parameter are different, and/or parameter values of the same parameter item in the first DRX configuration parameter and the second DRX configuration parameter are different.

In some examples, the first DRX configuration parameter includes: a first duration of a first drx-InactivityTimer; and the second DRX configuration parameter includes: a second duration of a second drx-InactivityTimer. The first duration is different from the second duration.

In an instance, drx-InactivityTimers with different durations are activated due to uplink and downlink grants. For example, when the uplink service dominates, an uplink new data grant (UL Grant) may start a drx-InactivityTimer with a longer duration, and a downlink new data grant (DL Grant) may use a drx-InactivityTimer with a shorter duration.

In some examples, the first DRX configuration parameter includes: a third duration of a first drx-ShortCycleTimer; and the second DRX configuration parameter includes: a fourth duration of a second drx-ShortCycleTimer. The third duration is different from the fourth duration.

In an instance, drx-ShortCycleTimer with different durations are activated when the inactivity timers enter a short cycle after timing out due to the uplink and downlink grants. For example, when the uplink service dominates, a drx-ShortCycleTimer with a longer duration is started when the inactivity timers enter the short cycle after timing out due to the uplink grant, and a drx-ShortCycleTimer with a shorter duration may be used in the downlink direction.

In some examples, the first DRX configuration parameter includes: the first drx-InactivityTimer is enabled or disabled; and the second DRX configuration parameter includes: the second drx-InactivityTimer is enabled or disabled.

In an instance, an inactivity duration timer may be used or not used due to the uplink and downlink grants. For example, when the uplink service dominates, the uplink new data grant may start the drx-InactivityTimer, and the drx-InactivityTimer in the downlink direction may be disenabled, that is, the second drx-InactivityTimer is not used.

In some examples, the first DRX configuration parameter includes: the first drx-ShortCycleTimer is enabled or disabled; and the second DRX configuration parameter includes: the second drx-ShortCycleTimer is enabled or disabled.

In an instance, disenabling of short cycle configuration means that the inactivity timers enter or do not enter the short cycle after timing out due to the uplink and downlink grants. For example, when the uplink service dominates, the inactivity timer may enter the short cycle after timing out due to the uplink grant, and the inactivity timer in the downlink direction still enters a long cycle.

In some examples, the first DRX configuration parameter includes: a first drx-ShortCycle; and the second DRX configuration parameter includes: a second drx-ShortCycle.

In an instance, different drx-ShortCycles are activated when the inactivity timers enter the short cycle after timing out due to the uplink and downlink grants. For example, when the uplink service dominates, a dense drx-ShortCycle may be started when the inactivity timer enters the short cycle after timing out due to the uplink grant, and a sparse drx-ShortCycle may be used for the downlink service.

Step 302, the UE obtains the DRX configuration parameters for DRX. The DRX configuration parameters for DRX include: the first DRX configuration parameter used by the uplink service and the second DRX configuration parameter used by the downlink service.

The UE receives the configuration information sent by the access network device, and obtains the DRX configuration parameters from the configuration information. The configuration information may be radio resource control (RRC).

The UE obtains the first DRX configuration parameter of the uplink service and the second DRX configuration parameter of the downlink service, and monitors the PDCCH with the first DRX configuration parameter or the second DRX configuration parameter during the same period of time.

In some examples, the UE monitors the PDCCH with the first DRX configuration parameter when the uplink service dominates, and monitors the PDCCH with the second DRX configuration parameter when the downlink service dominates.

The uplink service dominating means that the priority of the uplink service is higher than the priority of the downlink service in the recent period of time, or the quantity of uplink services is greater than the quantity of downlink services in the recent period of time.

The downlink service dominating means that the priority of the downlink service is higher than the priority of the uplink service in the recent period of time, or the quantity of downlink services is greater than the quantity of uplink services in the recent period of time.

To sum up, in the method provided by the example, the DRX configuration parameters for DRX are obtained, the DRX configuration parameters for DRX including: the first DRX configuration parameter used by the uplink service and the second DRX configuration parameter used by the downlink service. Since the first DRX configuration parameter and the second DRX configuration parameter may be different, the differentiated monitoring of a control channel when the uplink service dominates or when the downlink service dominates may be achieved with regard to the asymmetry of the uplink service and the downlink service, and the monitoring requirements of a terminal, for which service transmission in the uplink and downlink directions is asymmetrical, for the control channel are satisfied.

Figure 4:
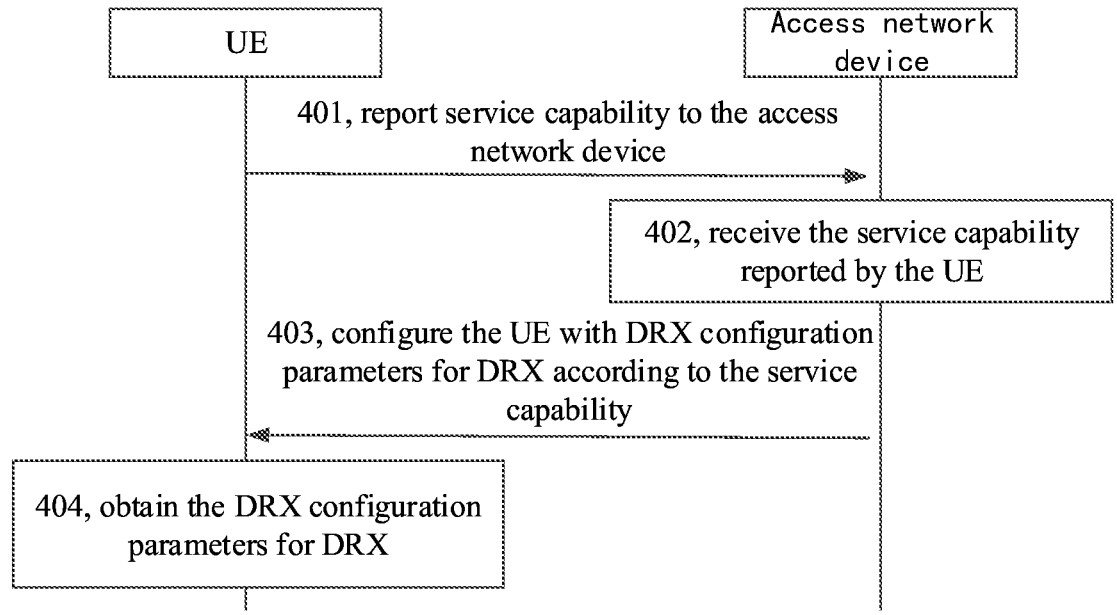
FIG. 4 is a flow diagram of a method for configuring parameters for DRX according to an example of the present disclosure.

FIG. 4 is a flow diagram of a method for configuring parameters for DRX according to another example of the present disclosure. The example is illustrated with the method applied to the communication system shown in FIG. 1 as an example. The method includes the following steps.

Step 401, UE reports UE capability to an access network device.

The UE capability is used to indicate whether an uplink service and a downlink service are supported to be configured with asymmetrical DRX configuration parameters (asymmetrical configuration for short). The example is illustrated with the UE capability supporting the asymmetrical configuration as an example.

In some examples, the access network device sends a UE capability enquiry to the UE, and the UE sends UE Capability Information to the access network device.

Step 402, the access network device receives the UE capability reported by the UE.

The access network device receives the UE capability information, and obtains the UE capability of the UE from the UE capability information.

In an instance, when a preset bit value in the UE capability is 1, it means that the UE capability supports the asymmetrical configuration; and when the preset bit value in the UE capability is 0, it means that the UE capability does not support the asymmetrical configuration.

Step 403, the access network device configures the UE with the DRX configuration parameters for DRX according to the UE capability.

When the UE capability is used to indicate that the UE supports the uplink service and the downlink service to be configured with the asymmetrical DRX configuration parameters, the access network device configures the UE with DRX configuration parameters for DRX (differentiated configuration for an uplink and a downlink). When the UE capability is used to indicate that the UE does not support the uplink service and the downlink service to be configured with asymmetrical DRX configuration parameters, the access network device configures the UE with DRX configuration parameters for DRX (the same configuration for the uplink and the downlink).

The DRX configuration parameters for DRX include: a first DRX configuration parameter used by the uplink service and a second DRX configuration parameter used by the downlink service.

Step 404, the UE obtains the DRX configuration parameters for DRX.

The UE obtains the first DRX configuration parameter of the uplink service and the second DRX configuration parameter of the downlink service, and monitors a PDCCH with the first DRX configuration parameter or the second DRX configuration parameter during the same period of time.

In some examples, the UE monitors the PDCCH with the first DRX configuration parameter when the uplink service dominates, and monitors the PDCCH with the second DRX configuration parameter when the downlink service dominates.

To sum up, in the method provided by the example, whether the UE supports the asymmetrical configuration of the uplink and the downlink is indicated for the access network device via the UE capability information reported by the UE to the access network device. The access network device may configure the UE with the different first DRX configuration parameter and second DRX configuration parameter in the uplink and the downlink only when the UE supports the asymmetrical configuration of the uplink and the downlink, such that the UE may achieve the differentiated monitoring of the control channel when the uplink service dominates or when the downlink service dominates, and the monitoring requirements of a terminal, for which service transmission in the uplink and downlink directions is asymmetrical, for the control channel are satisfied.

Figure 5:
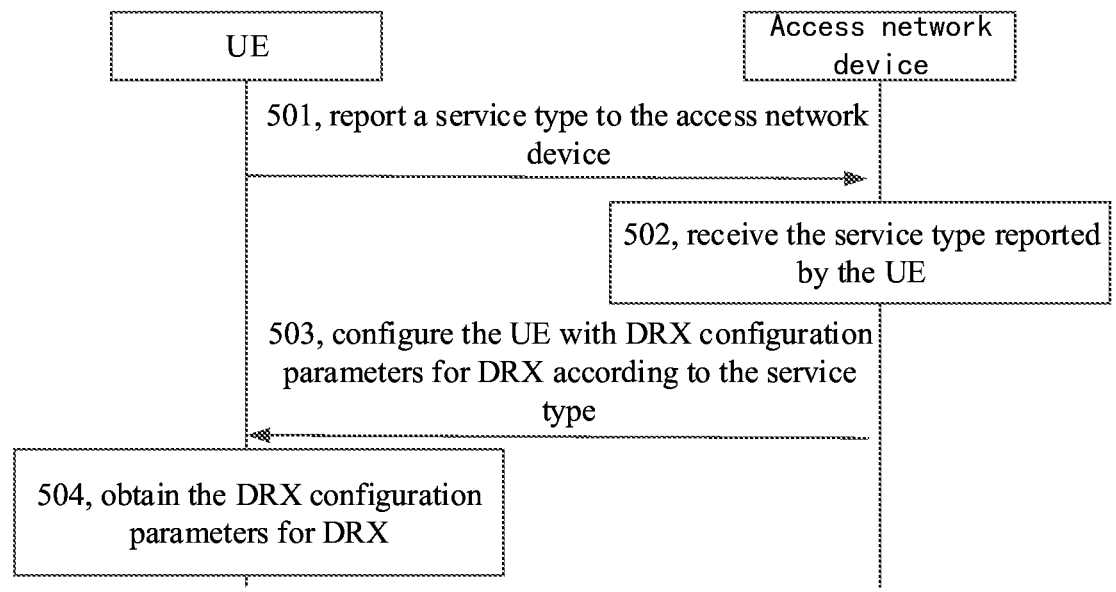
FIG. 5 is a flow diagram of a method for configuring parameters for DRX according to an example of the present disclosure.

FIG. 5 is a flow diagram of a method for configuring parameters for DRX according to yet another example of the present disclosure. The example is illustrated with the method applied to the communication system shown in FIG. 1 as an example. The method includes the following steps.

S501, UE reports a service type to an access network device.

In some examples, the service type includes, but is not limited to: NR terminals, industrial sensors, video surveillance, and wearable devices.

Step 502, the access network device receives the service type reported by the UE.

Step 503, the access network device configures the UE with DRX configuration parameters for DRX according to the service type.

When the service type is used to indicate that the UE supports an uplink service and a downlink service to be configured with asymmetrical DRX configuration parameters, the access network device configures the UE with DRX configuration parameters for DRX (differentiated configuration for an uplink and a downlink). When the service type is used to indicate that the UE does not support the uplink service and the downlink service to be configured with asymmetrical DRX configuration parameters, the access network device configures the UE with DRX configuration parameters for DRX (the same configuration for the uplink and the downlink).

For example, when the service type includes video surveillance, it means that the UE supports asymmetrical configuration of the uplink and the downlink.

The DRX configuration parameters for DRX include: a first DRX configuration parameter used by the uplink service and a second DRX configuration parameter used by the downlink service.

Step 504, the UE obtains the DRX configuration parameters for DRX.

The UE obtains the first DRX configuration parameter of the uplink service and the second DRX configuration parameter of the downlink service, and monitors a PDCCH with the first DRX configuration parameter or the second DRX configuration parameter during the same period of time.

In some examples, the UE monitors the PDCCH with the first DRX configuration parameter when the uplink service dominates, and monitors the PDCCH with the second DRX configuration parameter when the downlink service dominates.

To sum up, in the method provided by the example, whether the UE supports the asymmetrical configuration of the uplink and the downlink is indicated for the access network device via the service type reported by the UE to the access network device. The access network device may configure the UE with the different first DRX configuration parameter and second DRX configuration parameter in the uplink and the downlink only when a service type of the UE supports the asymmetrical configuration of the uplink and the downlink, such that the UE may achieve the differentiated monitoring of the control channel when the uplink service dominates or when the downlink service dominates, and the monitoring requirements of a terminal, for which service transmission in the uplink and downlink directions is asymmetrical, for the control channel are satisfied.

Figure 6:
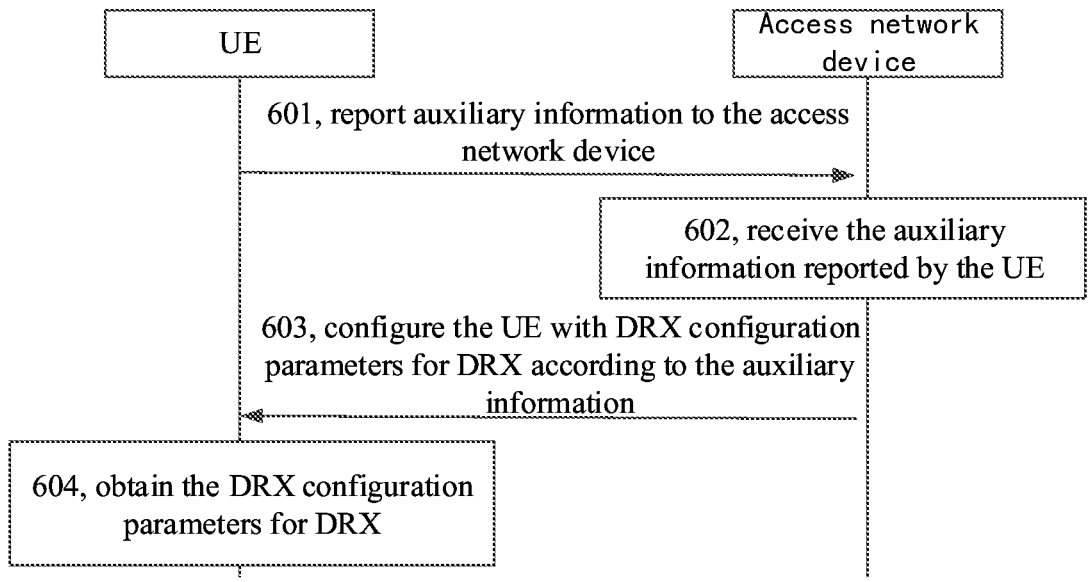
FIG. 6 is a schematic flow diagram of an information processing method according to an example of the present application.

FIG. 6 is a flow diagram of a method for configuring parameters for DRX according to yet another example of the present disclosure. The example is illustrated with the method applied to the communication system shown in FIG. 1 as an example. The method includes the following steps.

Step 601, UE reports auxiliary information to an access network device.

The UE generates the auxiliary information according to running conditions of the UE. The running conditions include but are not limited to: there is uplink service transmission, an uplink service dominates, or a downlink service dominates.

In some examples, reporting of the auxiliary information includes: reporting radio resource control (RRC) signaling, the RRC signaling carrying the auxiliary information; or reporting a medium access control control element (MAC CE), the MAC CE carrying the auxiliary information.

Step 602, the access network device receives the auxiliary information reported by the UE.

The access network device receives the RRC signaling or the MAC CE reported by the UE, and obtains the auxiliary information from the RRC signaling or the MAC CE.

The auxiliary information includes at least one of the following information:
a dominant service of the uplink service and the downlink service;
the first DRX configuration parameter suggested for the uplink service;
the second DRX configuration parameter suggested for the downlink service;
an enabled state or disabled state suggested for at least one parameter item in the first DRX configuration parameter; and
an enabled state or disabled state suggested for at least one parameter item in the second DRX configuration parameter.

Step 603, the access network device configures the UE with DRX configuration parameters for DRX according to the auxiliary information.

The access network device may generate the DRX configuration parameters with reference to the auxiliary information.

In some examples, the access network device receives a suggestion from the UE to generate DRX configuration parameters that are exactly the same as the suggestion from the UE. In some examples, the access network device may not receive the suggestion from the UE to generate DRX configuration parameters completely or partially different from the suggestion from the UE.

The DRX configuration parameters for DRX include: a first DRX configuration parameter used by the uplink service and a second DRX configuration parameter used by the downlink service.

Step 604, the UE obtains the DRX configuration parameters for DRX.

The UE obtains the first DRX configuration parameter of the uplink service and the second DRX configuration parameter of the downlink service, and monitors a PDCCH with the first DRX configuration parameter or the second DRX configuration parameter during the same period of time.

In some examples, the UE monitors the PDCCH with the first DRX configuration parameter when the uplink service dominates, and monitors the PDCCH with the second DRX configuration parameter when the downlink service dominates.

To sum up, in the method provided by the example, asymmetrical configuration suggested by the UE for the uplink and the downlink is indicated for the access network device via the auxiliary information reported by the UE to the access network device. The access network device configures the UE with the different first DRX configuration parameter and second DRX configuration parameter in uplink and the downlink according to the auxiliary information, such that the UE has the capability to participate in the decision-making process, and achieves the differentiated monitoring of the control channel when the uplink service dominates or when the downlink service dominates, and the monitoring requirements of a terminal, for which service transmission in the uplink and downlink directions is asymmetrical, for the control channel are satisfied.

Figure 7:
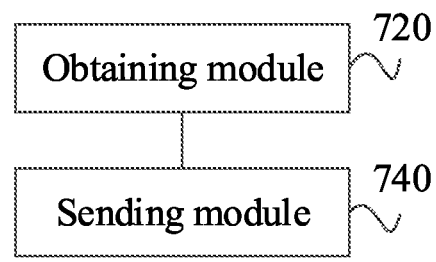
FIG. 7 is a block diagram of an apparatus for configuring parameters for DRX according to an example of the present disclosure.

FIG. 7 is a block diagram of an apparatus for configuring parameters for DRX according to an example of the present disclosure. The apparatus includes:
an obtaining module 720, configured to obtain DRX configuration parameters for DRX. The DRX configuration parameters for DRX include: a first DRX configuration parameter used by an uplink service and a second DRX configuration parameter used by a downlink service.

In an example, the first DRX configuration parameter is different from the second DRX configuration parameter.

In an example, the first DRX configuration parameter includes: a first duration of a first discontinuous reception inactivity timer (drx-InactivityTimer); and the second DRX configuration parameter includes: a second duration of a second discontinuous reception inactivity timer (drx-InactivityTimer). The first duration is different from the second duration.

In an example, the first DRX configuration parameter includes: a third duration of a first discontinuous reception short cycle timer (drx-ShortCycleTimer); and the second DRX configuration parameter includes: a fourth duration of a second discontinuous reception short cycle timer (drx-ShortCycleTimer). The third duration is different from the fourth duration.

In an example, the first DRX configuration parameter includes: the first discontinuous reception inactivity timer (drx-InactivityTimer) is enabled or disabled; and the second DRX configuration parameter includes: the second discontinuous reception inactivity timer (drx-InactivityTimer) is enabled or disabled.

In an example, the first DRX configuration parameter includes: the first discontinuous reception short cycle timer (drx-ShortCycleTimer) is enabled or disabled; and the second DRX configuration parameter includes: the second discontinuous reception short cycle timer (drx-ShortCycleTimer) is enabled or disabled.

In an example, the first DRX configuration parameter includes: a first discontinuous reception short cycle (drx-ShortCycle); and the second DRX configuration parameter includes: a second discontinuous reception short cycle (drx-ShortCycle).

In an example, the apparatus further includes:
a sending module 740, configured to report UE capability, where the UE capability is used to indicate whether the uplink service and the downlink service are supported to be configured with asymmetrical DRX configuration parameters; or, a sending module 740, configured to report a service type of UE, where the service type is used to indicate whether the uplink service and the downlink service are supported to be configured with asymmetrical DRX configuration parameters.

In an example, the apparatus further includes:
a sending module 740, configured to report auxiliary information. The auxiliary information is used to inform a network side device that it is expected to configure the uplink service and the downlink with the asymmetrical DRX configuration parameters.

In an example, the auxiliary information includes at least one of the following information:
- a dominant service of the uplink service and the downlink service;
- the first DRX configuration parameter suggested for the uplink service;
- the second DRX configuration parameter suggested for the downlink service;
- an enabled state or disabled state suggested for at least one parameter item in the first DRX configuration parameter; and
- an enabled state or disabled state suggested for at least one parameter item in the second DRX configuration parameter.

In an example, the sending module 740 is configured to report radio resource control (RRC) signaling, the RRC signaling carrying the auxiliary information; or, the sending module 740 is configured to report a MEDIUM ACCESS CONTROL CONTROL ELEMENT (MAC CE), the MAC CE carrying the auxiliary information.

Figure 8:
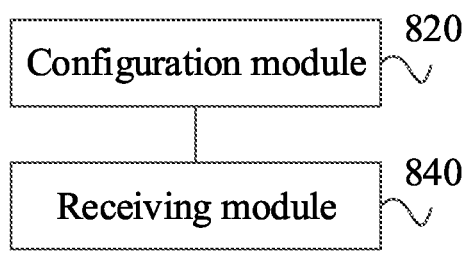
FIG. 8 is a block diagram of an apparatus for configuring parameters for DRX according to an example of the present disclosure.

FIG. 8 is a block diagram of an apparatus for configuring parameters for discontinuous reception (DRX) according to an example of the present disclosure. The apparatus includes:
- a configuration module 820, configured to configure user equipment (UE) with DRX configuration parameters for DRX. The DRX configuration parameters for DRX include: a first DRX configuration parameter used by an uplink service and a second DRX configuration parameter used by a downlink service.

In an example, the first DRX configuration parameter is different from the second DRX configuration parameter.

In an example, the first DRX configuration parameter includes: a first duration of a first discontinuous reception inactivity timer (drx-InactivityTimer).

The second DRX configuration parameter includes: a second duration of a second discontinuous reception inactivity timer (drx-InactivityTimer). The first duration is different from the second duration.

In an example, the first DRX configuration parameter includes: a third duration of a first discontinuous reception short cycle timer (drx-ShortCycleTimer); and the second DRX configuration parameter includes: a fourth duration of a second discontinuous reception short cycle timer (drx-ShortCycleTimer). The third duration is different from the fourth duration.

In an example, the first DRX configuration parameter includes: the first discontinuous reception inactivity timer (drx-InactivityTimer) is enabled or disabled; and the second DRX configuration parameter includes: the second discontinuous reception inactivity timer (drx-InactivityTimer) is enabled or disabled.

In an example, the first DRX configuration parameter includes: the first discontinuous reception short cycle timer (drx-ShortCycleTimer) is enabled or disabled; and the second DRX configuration parameter includes: the second discontinuous reception short cycle timer (drx-ShortCycleTimer) is enabled or disabled.

In an example, the first DRX configuration parameter includes: a first discontinuous reception short cycle (drx-ShortCycle); and the second DRX configuration parameter includes: a second discontinuous reception short cycle (drx-ShortCycle).

In an example, the apparatus further includes:
- a receiving module 840, configured to receive UE capability reported by the UE, where the configuration module is configured to perform the step of configuring UE with DRX configuration parameters for DRX when the UE capability is used to indicate that the UE supports the uplink service and the downlink service to be configured with asymmetrical DRX configuration parameters; or
- a receiving module 840, configured to receive a service type reported by the UE. The configuration module is configured to perform the step of configuring UE with DRX configuration parameters for DRX when the service type is used to indicate that the UE supports the uplink service and the downlink service to be configured with asymmetrical DRX configuration parameters.

In an example, the apparatus further includes: a receiving module 840, configured to receive auxiliary information. The configuration module 820 is configured to perform the step of configuring UE with DRX configuration parameters for DRX according to the auxiliary information.

In an example, the auxiliary information includes at least one of the following information:
- a dominant service of the uplink service and the downlink service;
- the first DRX configuration parameter suggested for the uplink service;
- the second DRX configuration parameter suggested for the downlink service;
- an enabled state or disabled state suggested for at least one parameter item in the first DRX configuration parameter; and
- an enabled state or disabled state suggested for at least one parameter item in the second DRX configuration parameter.

In an example, the receiving module 840 is configured to receive radio resource control (RRC) signaling, the RRC signaling carrying the auxiliary information. Or, the receiving module 840 is configured to receive a MEDIUM ACCESS CONTROL CONTROL ELEMENT (MAC CE), the MAC CE carrying the auxiliary information.

Figure 9:
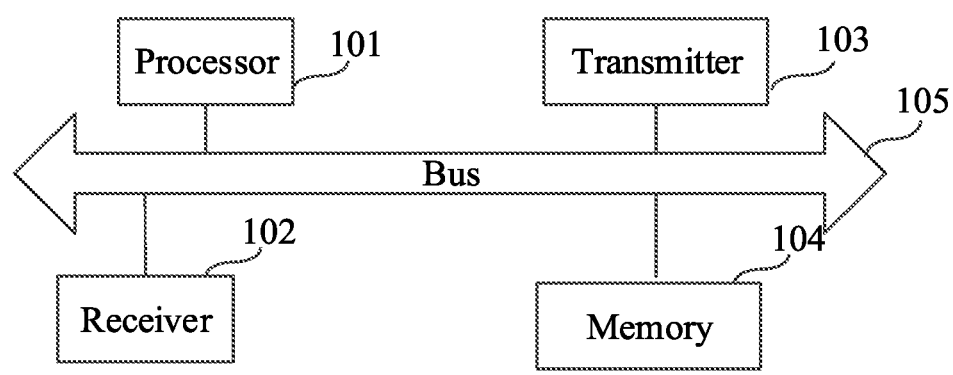
FIG. 9 is a block diagram of a communication device according to an example of the present disclosure.

FIG. 9 is a schematic structural diagram of a terminal according to an example of the present disclosure. The terminal includes: a processor 101, a receiver 102, a transmitter 103, a memory 104, and a bus 105.

The processor 101 includes one or more processing cores, and the processor 101 executes functional applications and information processing by running software programs and modules.

The receiver 102 and the transmitter 103 may be implemented as a communication component, and the communication component may be a communication chip.

The memory 104 is connected to the processor 101 via the bus 105.

The memory 104 may be configured to store at least one instruction, and the processor 101 is configured to implement the steps in the above method examples by executing the at least one instruction.

In addition, the memory 104 may be implemented by any type or combination of volatile or non-volatile storage devices including, but not limited to, magnetic or compact disks, an electrically erasable programmable read only memory (EEPROM), an erasable programmable read only memory (EPROM), a static random access memory (SRAM), a read only memory (ROM), a magnetic memory, a flash memory, and a programmable read only memory (PROM).

A computer-readable storage medium is further provided in an example. The computer-readable storage medium stores at least one instruction, at least one program, a code set or an instruction set to be loaded and executed by a processor to implement the method for configuring parameters for DRX according to the above method examples.

Those of ordinary skill in the art can understand that all or part of the steps of implementing the above examples can be completed by hardware, or can be completed by instructing relevant hardware through a program, and the program can be stored in a computer-readable storage medium. The storage medium may be a read only memory, a magnetic disk or a compact disk, etc.

The above descriptions are only optional examples of the present disclosure, and are not intended to limit the present disclosure. Any modifications, equivalent replacements, improvements, etc. made within the spirit and principles of the present disclosure shall fall within the scope of protection of the present disclosure.

Additional non-limiting examples of the disclosure include:

1. A method for configuring parameters for discontinuous reception (DRX), including:
    obtaining DRX configuration parameters for DRX, the DRX configuration parameters for DRX including: a first DRX configuration parameter used by an uplink service and a second DRX configuration parameter used by a downlink service.
2. The method according to example 1, where the first DRX configuration parameter is different from the second DRX configuration parameter.
3. The method according to example 2, where
    the first DRX configuration parameter includes: a first duration of a first discontinuous reception inactivity timer (drx-InactivityTimer); and
    the second DRX configuration parameter includes: a second duration of a second drx-InactivityTimer, where the first duration is different from the second duration.
4. The method according to examples 2 or 3, where
    the first DRX configuration parameter includes: a third duration of a first discontinuous reception short cycle timer (drx-ShortCycleTimer); and
    the second DRX configuration parameter includes: a fourth duration of a second drx-ShortCycleTimer, where
    the third duration is different from the fourth duration.
5. The method according to any one of examples 2 to 4, where
    the first DRX configuration parameter includes: enabling or disabling a first discontinuous reception inactivity timer (drx-InactivityTimer); and
    the second DRX configuration parameter includes: enabling or disabling a second discontinuous reception inactivity timer (drx-InactivityTimer).
6. The method according to any one of examples 2 to 5, where
    the first DRX configuration parameter includes: enabling or disabling a first discontinuous reception short cycle timer (drx-ShortCycleTimer); and
    the second DRX configuration parameter includes: enabling or disabling a second discontinuous reception short cycle timer (drx-ShortCycleTimer).
7. The method according to any one of examples 2 to 6, where
    the first DRX configuration parameter includes: a first discontinuous reception short cycle (drx-ShortCycle); and
    the second DRX configuration parameter includes: a second discontinuous reception short cycle (drx-ShortCycle).
8. The method according to any one of examples 1 to 7, further including:
    reporting UE capability, where the UE capability is used to indicate whether the uplink service and the downlink service are supported to be configured with asymmetrical DRX configuration parameters;
    or,
    reporting a service type of UE, where the service type is used to indicate whether the uplink service and the downlink service are supported to be configured with asymmetrical DRX configuration parameters.
9. The method according to any one of examples 1 to 7, further including:
    reporting auxiliary information, where the auxiliary information is used to inform a network side device that it is expected to configure the uplink service and the downlink service with asymmetrical DRX configuration parameters.
10. The method according to example 9, where the auxiliary information includes at least one of the following information:
    a dominant service of the uplink service and the downlink service;
    the first DRX configuration parameter suggested for the uplink service;
    the second DRX configuration parameter suggested for the downlink service;
    an enabled state or disabled state suggested for at least one parameter item in the first DRX configuration parameter; and
    an enabled state or disabled state suggested for at least one parameter item in the second DRX configuration parameter.
11. The method according to examples 9 or 10, where reporting auxiliary information includes:
    reporting radio resource control (RRC) signaling, the RRC signaling carrying the auxiliary information;
    or,
    reporting a medium access control control element (MAC CE), the MAC CE carrying the auxiliary information.
12. A method for configuring parameters for discontinuous reception (DRX), including:
    configuring user equipment (UE) with DRX configuration parameters for DRX, the DRX configuration parameters for DRX including: a first DRX configuration parameter used by an uplink service and a second DRX configuration parameter used by a downlink service.
13. The method according to example 12, where the first DRX configuration parameter is different from the second DRX configuration parameter.
14. The method according to example 13, where
    the first DRX configuration parameter includes: a first duration of a first discontinuous reception inactivity timer (drx-InactivityTimer); and
    the second DRX configuration parameter includes: a second duration of a second discontinuous reception inactivity timer (drx-InactivityTimer), where
    the first duration is different from the second duration.
15. The method according to examples 13 or 14, where
    the first DRX configuration parameter includes: a third duration of a first discontinuous reception short cycle timer (drx-ShortCycleTimer);
    the second DRX configuration parameter includes: a fourth duration of a second discontinuous reception short cycle timer (drx-ShortCycleTimer), where
    the third duration is different from the fourth duration.

16. The method according to any one of examples 13 to 15, where
the first DRX configuration parameter includes: enabling or disabling a first discontinuous reception inactivity timer (drx-InactivityTimer); and
the second DRX configuration parameter includes: enabling or disabling a second discontinuous reception inactivity timer (drx-InactivityTimer).
17. The method according to any one of examples 13 to 16, where
the first DRX configuration parameter includes: enabling or disabling a first discontinuous reception short cycle timer (drx-ShortCycleTimer); and
the second DRX configuration parameter includes: enabling or disabling a second discontinuous reception short cycle timer (drx-ShortCycleTimer).
18. The method according to any one of examples 13 to 17, where
the first DRX configuration parameter includes: a first discontinuous reception short cycle (drx-ShortCycle); and
the second DRX configuration parameter includes: a second discontinuous reception short cycle (drx-ShortCycle).
19. The method according to any one of examples 12 to 18, further including:
receiving UE capability reported by the UE; and performing the step of configuring UE with DRX configuration parameters for DRX when the UE capability is used to indicate that the UE supports the uplink service and the downlink service to be configured with asymmetrical DRX configuration parameters;
or,
receiving a service type reported by the UE; and performing the step of configuring UE with DRX configuration parameters for DRX when the service type is used to indicate that the UE supports the uplink service and the downlink service to be configured with asymmetrical DRX configuration parameters.
20. The method according to any one of examples 12 to 18, further including:
receiving auxiliary information; and
performing the step of configuring UE with DRX configuration parameters for DRX according to the auxiliary information.
21. The method according to example 20, where the auxiliary information includes at least one of the following information:
a dominant service of the uplink service and the downlink service;
the first DRX configuration parameter suggested for the uplink service;
the second DRX configuration parameter suggested for the downlink service;
an enabled state or disabled state suggested for at least one parameter item in the first DRX configuration parameter; and
an enabled state or disabled state suggested for at least one parameter item in the second DRX configuration parameter.
22. The method according to examples 20 or 21, where receiving auxiliary information includes:
receiving radio resource control (RRC) signaling, the RRC signaling carrying the auxiliary information;
or,
receiving a medium access control control element (MAC CE), the MAC CE carrying the auxiliary information.

23. An apparatus for configuring parameters for discontinuous reception (DRX), including:
an obtaining module, configured to obtain DRX configuration parameters for DRX, the DRX configuration parameters for DRX including: a first DRX configuration parameter used by an uplink service and a second DRX configuration parameter used by a downlink service.
24. The apparatus according to example 23, where the first DRX configuration parameter is different from the second DRX configuration parameter.
25. The apparatus according to example 24, where
the first DRX configuration parameter includes: a first duration of a first discontinuous reception inactivity timer (drx-InactivityTimer); and
the second DRX configuration parameter includes: a second duration of a second discontinuous reception inactivity timer (drx-InactivityTimer), where
the first duration is different from the second duration.
26. The apparatus according to examples 24 or 25, where
the first DRX configuration parameter includes: a third duration of a first discontinuous reception short cycle timer (drx-ShortCycleTimer); and
the second DRX configuration parameter includes: a fourth duration of a second discontinuous reception short cycle timer (drx-ShortCycleTimer), where
the third duration is different from the fourth duration.
27. The apparatus according to any one of examples 24 to 26, where
the first DRX configuration parameter includes: enabling or disabling a first discontinuous reception inactivity timer (drx-InactivityTimer); and
the second DRX configuration parameter includes: enabling or disabling a second discontinuous reception inactivity timer (drx-InactivityTimer).
28. The apparatus according to any one of examples 24 to 27, where
the first DRX configuration parameter includes: enabling or disabling a first discontinuous reception short cycle timer (drx-ShortCycleTimer); and
the second DRX configuration parameter includes: enabling or disabling a second discontinuous reception short cycle timer (drx-ShortCycleTimer).
29. The apparatus according to any one of examples 24 to 28, where
the first DRX configuration parameter includes: a first discontinuous reception short cycle (drx-ShortCycle); and
the second DRX configuration parameter includes: a second discontinuous reception short cycle (drx-ShortCycle).
30. The apparatus according to any one of examples 23 to 29, further including:
a sending module, configured to report UE capability, where the UE capability is used to indicate whether the uplink service and the downlink service are supported to be configured with asymmetrical DRX configuration parameters;
or,
a sending module, configured to report a service type of UE, where the service type is used to indicate whether the uplink service and the downlink service are supported to be configured with asymmetrical DRX configuration parameters.
31. The apparatus according to any one of examples 23 to 29, further including:

a sending module, configured to report auxiliary information, where the auxiliary information is used to inform a network side device that it is expected to configure the uplink service and the downlink service with asymmetrical DRX configuration parameters.

32. The apparatus according to example 31, where the auxiliary information includes at least one of the following information:

a dominant service of the uplink service and the downlink service;

the first DRX configuration parameter suggested for the uplink service;

the second DRX configuration parameter suggested for the downlink service;

an enabled state or disabled state suggested for at least one parameter item in the first DRX configuration parameter; and an enabled state or disabled state suggested for at least one parameter item in the second DRX configuration parameter.

33. The apparatus according to examples 31 or 32, where the sending module is configured to report radio resource control (RRC) signaling, the RRC signaling carrying the auxiliary information;

or, the sending module is configured to report a medium access control control element (MAC CE), the MAC CE carrying the auxiliary information.

34. An apparatus for configuring parameters for discontinuous reception (DRX), including:

a configuration module, configured to configure user equipment (UE) with DRX configuration parameters for DRX, the DRX configuration parameters for DRX including: a first DRX configuration parameter used by an uplink service and a second DRX configuration parameter used by a downlink service.

35. The apparatus according to example 34, where the first DRX configuration parameter is different from the second DRX configuration parameter.

36. The apparatus according to example 35, where the first DRX configuration parameter includes: a first duration of a first discontinuous reception inactivity timer (drx-InactivityTimer); and the second DRX configuration parameter includes: a second duration of a second discontinuous reception inactivity timer (drx-InactivityTimer), where the first duration is different from the second duration.

37. The apparatus according to examples 35 or 36, where the first DRX configuration parameter includes: a third duration of a first discontinuous reception short cycle timer (drx-ShortCycleTimer); and the second DRX configuration parameter includes: a fourth duration of a second discontinuous reception short cycle timer (drx-ShortCycleTimer), where the third duration is different from the fourth duration.

38. The apparatus according to any one of examples 35 to 37, where:

the first DRX configuration parameter includes: enabling or disabling a first discontinuous reception inactivity timer (drx-InactivityTimer); and the second DRX configuration parameter includes: enabling or disabling a second discontinuous reception inactivity timer (drx-InactivityTimer).

39. The apparatus according to any one of examples 35 to 38, where the first DRX configuration parameter includes: enabling or disabling a first discontinuous reception short cycle timer (drx-ShortCycleTimer); and the second DRX configuration parameter includes: enabling or disabling a second discontinuous reception short cycle timer (drx-ShortCycleTimer).

40. The apparatus according to any one of examples 35 to 39, where the first DRX configuration parameter includes: a first discontinuous reception short cycle (drx-ShortCycle); and the second DRX configuration parameter includes: a second discontinuous reception short cycle (drx-ShortCycle).

41. The apparatus according to any one of examples 34 to 40, further including:

a receiving module, configured to receive UE capability reported by the UE, where the configuration module is configured to perform the step of configuring UE with DRX configuration parameters for DRX when the UE capability is used to indicate that the UE supports the uplink service and the downlink service to be configured with asymmetrical DRX configuration parameters;

or, a receiving module, configured to receive a service type reported by the UE, where the configuration module is configured to perform the step of configuring UE with DRX configuration parameters for DRX when the service type is used to indicate that the UE supports the uplink service and the downlink service to be configured with asymmetrical DRX configuration parameters.

42. The apparatus according to any one of examples 34 to 40, further including:

a receiving module, configured to receive auxiliary information, where the configuration module is configured to perform the step of configuring UE with DRX configuration parameters for DRX according to the auxiliary information.

43. The apparatus according to example 42, where the auxiliary information includes at least one of the following information:

a dominant service of the uplink service and the downlink service;

the first DRX configuration parameter suggested for the uplink service;

the second DRX configuration parameter suggested for the downlink service;

an enabled state or disabled state suggested for at least one parameter item in the first DRX configuration parameter; and an enabled state or disabled state suggested for at least one parameter item in the second DRX configuration parameter.

44. The apparatus according to examples 42 or 43, where the receiving module is configured to receive radio resource control (RRC) signaling, the RRC signaling carrying the auxiliary information;

or, the receiving module is configured to receive a medium access control control element (MAC CE), the MAC CE carrying the auxiliary information.

45. A terminal, including:

a processor;

a transceiver connected to the processor; and a memory configured to store executable instructions of the processor, where the processor is configured to implement the method for configuring parameters for DRX according to any one of examples 1 to 11 by loading and executing the executable instructions.

46. An access network device, including:

a processor;

a transceiver connected to the processor; and a memory configured to store executable instructions of the processor, where the processor is configured to implement the method for configuring parameters for DRX according to any one of examples 12 to 22 by loading and executing the executable instructions.

47. A non-transitory computer-readable storage medium, storing executable instructions, where the method for configuring parameters for DRX according to any one of examples 1 to 22 is implemented by loading and executing the executable instructions via a processor.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for configuring parameters for discontinuous reception (DRX), comprising:
   obtaining by user equipment (UE), DRX configuration parameters for DRX, the DRX configuration parameters for DRX comprising: a first DRX configuration parameter used by an uplink service and a second DRX configuration parameter used by a downlink service;
   wherein the first DRX configuration parameter is different from the second DRX configuration parameter, the first DRX configuration parameter comprises: enabling or disabling a first discontinuous reception inactivity timer (drx-InactivityTimer); and the second DRX configuration parameter comprises: enabling or disabling a second discontinuous reception inactivity timer (drx-InactivityTimer), and the enabling or disabling of one of the first drx-inactivity timer and the second drx-InactivityTimer is determined by an uplink grant or a downlink grant.

2. The method according to claim 1, wherein
   the first DRX configuration parameter comprises: enabling or disabling a first discontinuous reception short cycle timer (drx-ShortCycleTimer); and
   the second DRX configuration parameter comprises: enabling or disabling a second discontinuous reception short cycle timer (drx-ShortCycleTimer).

3. The method according to claim 1, wherein
   the first DRX configuration parameter comprises: a first discontinuous reception short cycle (drx-ShortCycle); and
   the second DRX configuration parameter comprises: a second discontinuous reception short cycle (drx-ShortCycle).

4. The method according to claim 1, further comprising:
   reporting UE capability, wherein the UE capability is used to indicate whether the uplink service and the downlink service are supported to be configured with asymmetrical DRX configuration parameters;
   or,
   reporting a service type of UE, wherein the service type is used to indicate whether the uplink service and the downlink service are supported to be configured with asymmetrical DRX configuration parameters.

5. The method according to claim 1, further comprising:
   reporting auxiliary information, wherein the auxiliary information is used to inform a network side device that it is expected to configure the uplink service and the downlink service with asymmetrical DRX configuration parameters.

6. The method according to claim 5, wherein the auxiliary information comprises at least one of the following:
   a dominant service of the uplink service and the downlink service;
   the first DRX configuration parameter suggested for the uplink service;
   the second DRX configuration parameter suggested for the downlink service;
   an enabled state or disabled state suggested for at least one parameter item in the first DRX configuration parameter; and
   an enabled state or disabled state suggested for at least one parameter item in the second DRX configuration parameter.

7. The method according to claim 5, wherein reporting auxiliary information comprises:
   reporting radio resource control (RRC) signaling, the RRC signaling carrying the auxiliary information;
   or,
   reporting a medium access control element (MAC CE), the MAC CE carrying the auxiliary information.

8. A method for configuring parameters for discontinuous reception (DRX), comprising:
   configuring user equipment (UE) with DRX configuration parameters for DRX by network side device, the DRX configuration parameters for DRX comprising: a first DRX configuration parameter used by an uplink service and a second DRX configuration parameter used by a downlink service;
   wherein the first DRX configuration parameter is different from the second DRX configuration parameter, the first DRX configuration parameter comprises: enabling or disabling a first discontinuous reception inactivity timer (drx-InactivityTimer); and the second DRX configuration parameter comprises: enabling or disabling a second discontinuous reception inactivity timer (drx-InactivityTimer and the enabling or disabling of one of the first drx-inactivity timer and the second drx-InactivityTimer is determined by an uplink grant or a downlink grant.

9. The method according to claim 8, wherein
   the first DRX configuration parameter comprises: enabling or disabling a first discontinuous reception short cycle timer (drx-ShortCycleTimer); and
   the second DRX configuration parameter comprises: enabling or disabling a second discontinuous reception short cycle timer (drx-ShortCycleTimer).

10. The method according to claim 8, wherein
    the first DRX configuration parameter comprises: a first discontinuous reception short cycle (drx-ShortCycle); and the second DRX configuration parameter comprises: a second discontinuous reception short cycle (drx-Short-Cycle).

11. The method according to claim 8, comprising:
receiving UE capability reported by the UE; and configuring the UE with DRX configuration parameters for DRX when the UE capability is used to indicate that the UE supports the uplink service and the downlink service to be configured with asymmetrical DRX configuration parameters;

or, receiving a service type reported by the UE; and configuring the UE with DRX configuration parameters for DRX when the service type is used to indicate that the UE supports the uplink service and the downlink service to be configured with asymmetrical DRX configuration parameters.

12. The method according to claim 8, comprising:
receiving auxiliary information; and
configuring the UE with DRX configuration parameters for DRX according to the auxiliary information.

13. The method according to claim 12, wherein the auxiliary information comprises at least one of the following:
  a dominant service of the uplink service and the downlink service;
  the first DRX configuration parameter suggested for the uplink service;
  the second DRX configuration parameter suggested for the downlink service;
  an enabled state or disabled state suggested for at least one parameter item in the first DRX configuration parameter; and
  an enabled state or disabled state suggested for at least one parameter item in the second DRX configuration parameter.

14. The method according to claim 12, wherein receiving auxiliary information comprises:
receiving radio resource control (RRC) signaling, the RRC signaling carrying the auxiliary information;

or, receiving a medium access control element (MAC CE), the MAC CE carrying the auxiliary information.

15. A terminal, comprising:
a processor;
a transceiver connected to the processor; and
a memory configured to store executable instructions of the processor, wherein
the processor is configured to implement the method for configuring parameters for DRX according to claim 1 by loading and executing the executable instructions.

16. An access network device, comprising:
a processor;
a transceiver connected to the processor; and
a memory configured to store executable instructions of the processor, wherein the processor is configured to implement the method for configuring parameters for DRX according to claim 8 by loading and executing the executable instructions.

* * * * *